United States Patent [19]

Bremer et al.

[11] Patent Number: 5,759,231
[45] Date of Patent: Jun. 2, 1998

[54] METHOD FOR PROCESSING METAL CHIPS AND/OR METAL DUST

[75] Inventors: Karl-Guenther Bremer, Eschweiler, Germany; Pierre Lambrighs, Hasselt, Belgium

[73] Assignee: Filterwerk Mann & Hummel GmbH, Ludwigsburg, Germany

[21] Appl. No.: 653,969

[22] Filed: May 28, 1996

[30] Foreign Application Priority Data

May 27, 1995 [DE] Germany .................. 195 19 475.6

[51] Int. Cl.$^6$ ........................................... C22B 1/248
[52] U.S. Cl. .................. 75/379; 75/385; 75/416; 75/770
[58] Field of Search .................. 75/416, 770, 379, 75/385; 23/313 R

[56] References Cited

U.S. PATENT DOCUMENTS

| | | |
|---|---|---|
| 3,980,560 | 9/1976 | Eades et al. |
| 4,213,779 | 7/1980 | Caswell ............... 75/770 |
| 4,565,583 | 1/1986 | Venetta ............... 75/711 |
| 5,364,441 | 11/1994 | Worner ............... 75/416 |

FOREIGN PATENT DOCUMENTS

| | | |
|---|---|---|
| 623591 | 12/1935 | Germany. |
| 2151819 | 3/1973 | Germany. |
| 3934471 | 4/1991 | Germany. |
| 4019232 | 12/1991 | Germany. |
| 4028541 | 2/1992 | Germany. |

OTHER PUBLICATIONS

Tikhontsov et al., *Soviet Engineering Research*, "Water–Based Coolant Management Systems", 7 (1987) Jan., No. 1, pp. 44–46.

Munk, "Späneentölung und Kühlschmierstoffaufbereitung im Produktionsprozess", 215 *VDI Zeitschrift*, 130 (1988) Feb., No. 2, Düsseldorf, Dermany, pp. 62–67.

*Primary Examiner*—Melvyn Andrews
*Attorney, Agent, or Firm*—Evenson, McKeown, Edwards & Lenahan P.L.L.C.

[57] ABSTRACT

A method for processing metal chips and/or metal dust, including a first process step in which the metal is moistened and fed by a conveyor system to a collecting tank, especially a settling tank. In further process steps the material being processed passes from the collecting tank into a buffer tank, and from the buffer tank it is proportioned to a dewatering apparatus. In the dewatering apparatus the moisture is removed by compressed air. Removed moisture is fed back into the scraper flight conveyor settling tank, and then the dewatered metal is transferred to a container.

7 Claims, 2 Drawing Sheets

METHOD FOR PROCESSING METAL CHIPS AND/OR METAL DUST

BACKGROUND OF THE INVENTION

The invention relates to a method and apparatus for processing metal chips and/or metal dust, for example, from machining operations, in which the metal is moistened with a liquid in a first process step and transported by a conveyor system to a collecting tank, in particular a settling tank.

In dry processing of metal materials, especially in the processing of gray iron castings, it is known to vacuum up the metal dust thereby produced, add liquid, and deliver the resulting suspension to a container. This so-called gray iron sludge is then dispensed from the container by a conveyor. The sludge produced by this wet vacuuming must be disposed of, and the disposal of the mixture of gray-iron dust and liquid involves high costs. Of course, it is possible to remove the moisture from the mixture in a thermal drying apparatus. Such thermal drying, however, consumes a lot of energy. Furthermore, the evaporated moisture must be recooled.

SUMMARY OF THE INVENTION

It is an object of the invention to provide an improved method of processing metal dust and/or chips from machining operations which will produce a very good drying of the metal chips and metal dust.

It is another object of the invention to provide a method of processing metal dust and/or chips from machining operations which consumes a reduced amount of energy compared to prior processes.

A further object of the invention is to provide an improved apparatus for processing metal dust and/or chips from machining operations.

These and other objects are achieved in accordance with the present invention by providing a method for processing metal chips and/or metal dust from machining operations, comprising feeding the metal to a collecting tank and treating the metal with a liquid to form a metal sludge, delivering the metal sludge from the collecting tank via a conveyor system to a buffer tank, proportioning out the metal sludge from the buffer tank to a dewatering apparatus, removing liquid from the metal sludge in the dewatering apparatus by means of compressed air, recycling removed liquid back to the collecting tank, and discharging the dewatered metal from the dewatering apparatus for disposal or recycling.

In accordance with a further aspect of the invention, the objects are also achieved by providing an apparatus for processing metal chips and/or metal dust from machining operations comprising a collecting tank for collecting metal chips and/or dust and treating the collected metal with a liquid to form a sludge, a buffer tank to which metal sludge from the collecting tank is delivered, a conveyor which delivers metal sludge from the collecting tank to the buffer tank, a dewatering apparatus comprising a pressure tank containing a filter, and a pump which feeds sludge from the buffer tank into a conduit leading to the dewatering apparatus.

An important advantage of the invention is that the moisture is removed in a system which comprises a buffer tank and a moisture removing apparatus, in which the metal sludge is proportioned (i.e. dispensed in controlled, measured amounts) from the buffer tank into the moisture removing apparatus where the drying is performed by means of compressed air. The removed moisture or liquid is returned again into the collecting tank. Thus a closed circuit is formed, from which no moisture escapes into the environment. The dewatered metal chips are suitable for delivery directly to a recycling operation.

According to one embodiment of the invention, the dryness is controlled by a pressure sensor or by a moisture sensor. The pressure sensor senses the pressure of the compressed air introduced at the compressed air inlet. A drop in pressure indicates that the drying process has ended.

The invention also relates to an advantageous apparatus for carrying out the method of the invention. This apparatus is made up of simple components, and the control of the entire system is automatic. For this purpose appropriate sensors are provided both in the buffer tank and in the dewatering apparatus.

A plurality of buffer tanks and/or feeder units optionally can be connected to the dewatering system. The control apparatus is set to assure that when the buffer tank reaches the maximum fill level, it is emptied into the dewatering apparatus.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
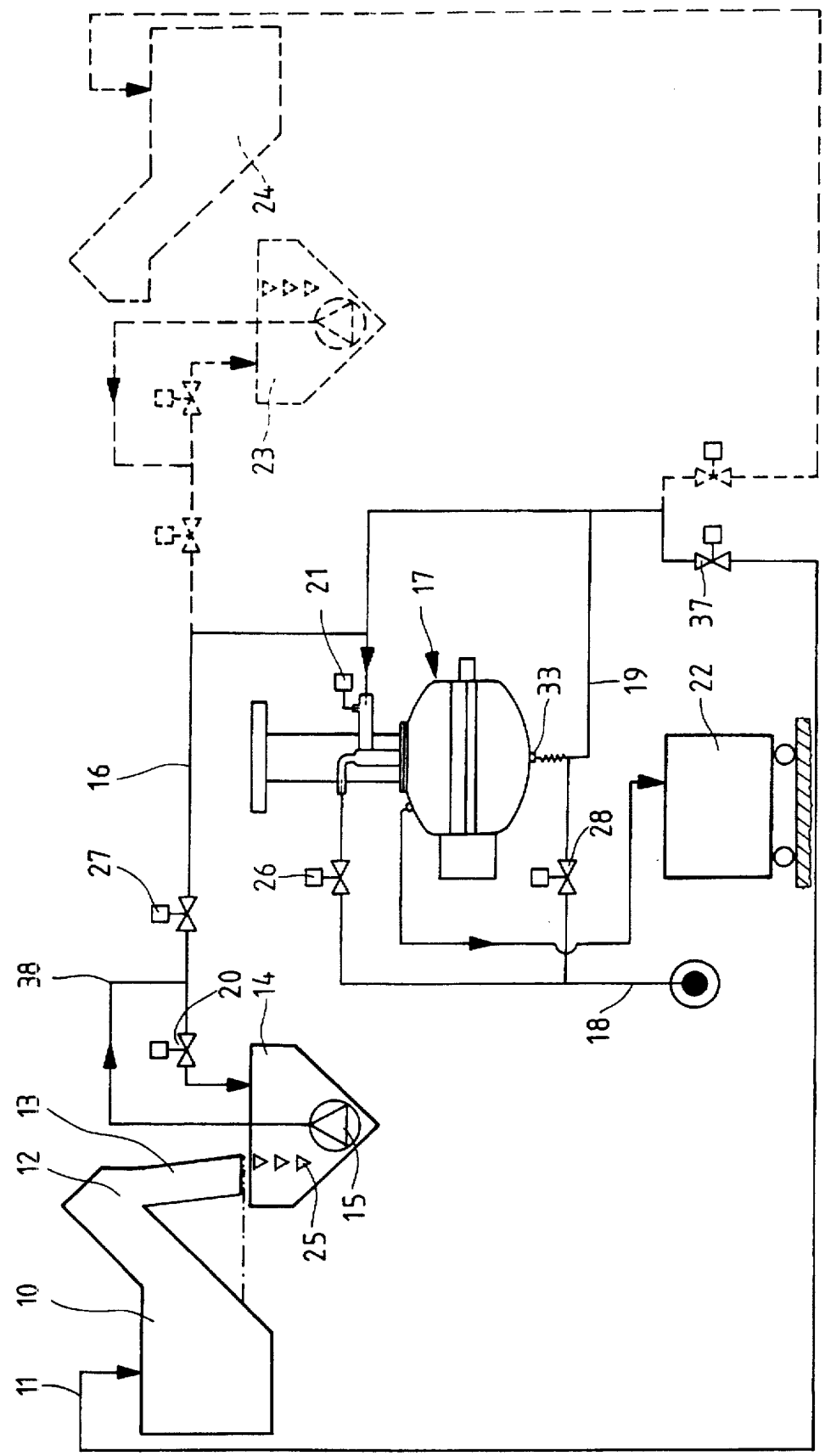
FIG. 1 is a schematic representation of a system for carrying out the method of the invention for processing metal chips and/or metal dust.

The system according to FIG. 1 comprises a scraper flight conveyor tank 10. This is a tank having a flight conveyor running on the bottom and on the ramp. A mixture of liquid and metal dust or metal chips is delivered to this tank.

In the finishing of gray castings, metal dust is formed which is moistened or treated with liquid for better transport. Thus a metal sludge is formed. This passes through a system of ducts or conduits to the settling tank with the flight conveyor. The sludge is carried upward through the neck 12 and delivered through the discharge opening 12 to a buffer tank 14.

From this buffer tank 14 the metal sludge is conveyed by a pump 15 through valve 27 and line or conduit 16 to the dewatering apparatus 17. The dewatering apparatus is filled with a specific amount of metal sludge, and then compressed air is introduced into it through the compressed air line 18. This removes moisture from the sludge, i.e., the moisture is driven downward through the pipe 19 and passes via valve 37 and line 11 back into the flight conveyor settling tank.

To prevent sedimentation of the metal particles in the buffer tank 14 during the air-pressure drying in the dewatering dome, the suspension can be pumped through a short recirculation circuit comprising pump 15, conduit 38 and valve 20.

A pressure monitor 21 is connected to the dewatering apparatus, and produces a signal as soon as the dewatering process is completed. At the commencement of the dewatering process, the pressure monitor shows a maximum pressure. During the dewatering process the pressure at the sludge inlet drops, and in the final phase of the dewatering a marked pressure drop occurs. This serves simultaneously as the signal for the emptying of the dewatering apparatus. Alternatively, a moisture sensor can be provided in or on the pressure tank of dewatering apparatus 17 for monitoring progress of the dewatering operation and detecting when the dewatered material is ready for discharge.

The bottom part of the dewatering container opens by pivoting downwardly. The dried sludge supported thereon, i.e., the dewatered metal chips or dewatered metal dust, drops into a vessel such as disposal wagon 22. After the dewatering apparatus 17 is closed again, the next charge of wet sludge can be introduced into it.

On the right side of FIG. 1 a second buffer tank 23 and a second scraper flight conveyor tank 24 are shown in broken lines. The metal sludge delivered to them can also be processed in the dewatering apparatus 17.

The moisture from line 19 is returned to the flight conveyor settling tank 10.

Level monitors 25 are provided in the buffer tank 14. The signals from these level monitors 25 is delivered to a switching system which controls the discharge of sludge from the buffer tank 14 into the dewatering apparatus 17.

Valves 26 are furthermore provided for the compressed air, as well as another valve 28 for flushing out or backwashing the dewatering apparatus 17 with compressed air. All the valves are electrically operated. The apparatus can therefore be fully automatic and thus facilitates economical operation.

Figure 2:
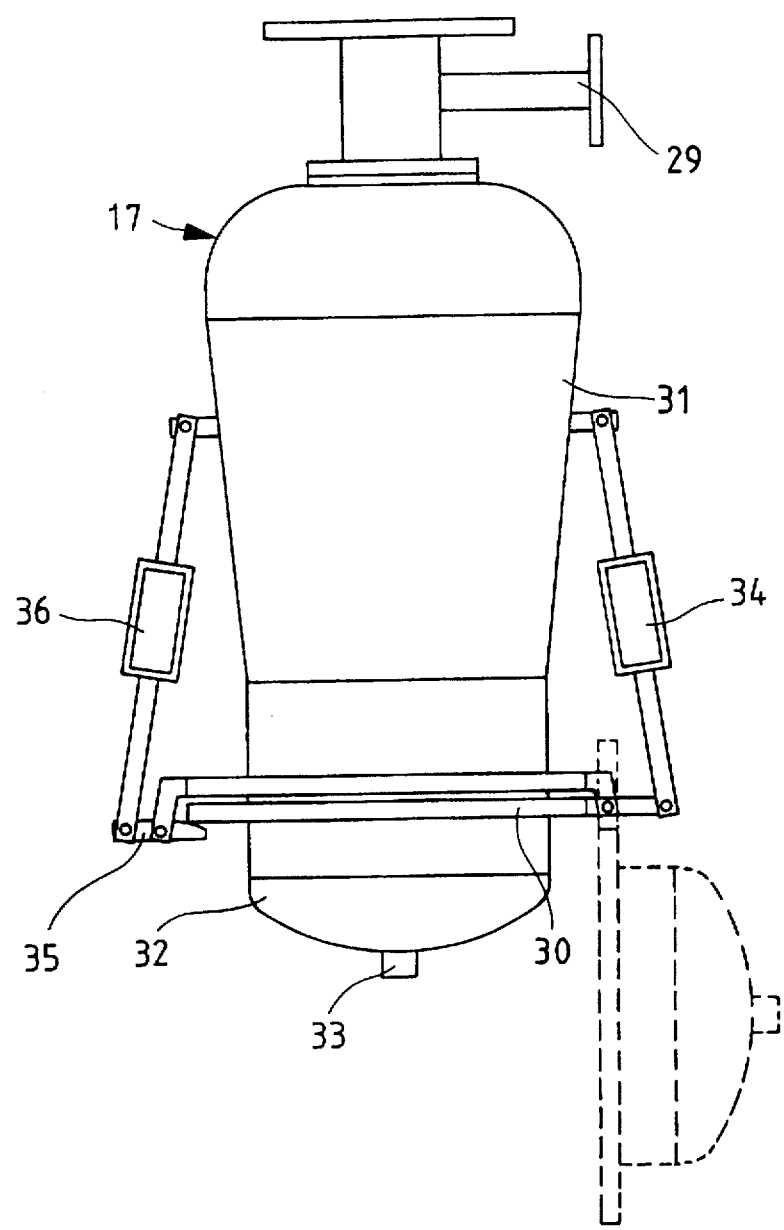
FIG. 2 is a detailed representation of a dewatering apparatus.

FIG. 2 shows a detailed illustration of the dewatering apparatus 17. This dewatering apparatus, which also is referred to as a drying dome, has an opening 29 at the top through which sludge to be dried is introduced.

In the lower region of the drying dome 17 there is a gap filter plate 30, which separates the upper part 31 in which the sludge feed is located, from the bottom part 32. The bottom part 32 is the liquid collecting space. Collected liquid is transferred through an opening 33 into line 19 (FIG. 1).

The gap filter plate 30 and the bottom part 32 of the dewatering apparatus 17 are configured as a pivotable bottom trap door, and can be opened by the air cylinder 34. To close the bottom trap door a closing mechanism is provided, which likewise is operated by an air cylinder 36.

As already mentioned, after the dewatering apparatus is filled, compressed air is introduced into the upper part 31. This drives the moisture out of the sludge, and the moisture collects in the bottom part and is disposed of through opening 33 and line 19. After the material has been dewatered, the bottom 32 of the pressure vessel is opened and the filter cake of dewatered metal dust and/or chips formed on the gap filter plate 30 is discharged.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A method for processing metal chips and/or metal dust from machining operations, comprising feeding the metal chips and/or dust to a collecting tank and moistening the metal chips and/or dust with a liquid to form a metal sludge, delivering the metal sludge from the collecting tank via a conveyor system to a buffer tank, dispensing controlled amounts of the metal sludge from the buffer tank to a deliquifying apparatus, removing the moisture from the metal sludge in the deliquifying apparatus by means of compressed air, recycling removed moisture back to the collecting tank, and discharging the deliquified metal chips and/or dust from the deliquifying apparatus for disposal or recycling.

2. A method according to claim 1, wherein said collecting tank comprises a settling tank, and chips and/or dust to be processed are delivered from the settling tank to the buffer tank by means of a scraper flight conveyor.

3. A method according to claim 1, further comprising monitoring the moisture removal in the dewatering apparatus and generating a signal indicative of the degree of moisture removal.

4. A method according to claim 3, wherein the moisture removal is monitored by means of a pressure sensor.

5. A method according to claim 3, wherein the moisture removal is monitored by means of a moisture sensor.

6. A method according to claim 1, further comprising connecting at least one additional buffer tank to the dewatering apparatus, and feeding metal chips and/or metal dust, which have been treated with liquid and discharged from a collecting tank, to said additional buffer tank.

7. A method according to claim 1, further comprising preventing sedimentation of metal particles in the buffer tank.

* * * * *